(No Model.) 2 Sheets—Sheet 1.

T. A. EDISON.
AUTOMATIC DETERMINING DEVICE FOR PHONOGRAPHS.

No. 430,277. Patented June 17, 1890.

(No Model.) 2 Sheets—Sheet 2.
T. A. EDISON.
AUTOMATIC DETERMINING DEVICE FOR PHONOGRAPHS.
No. 430,277. Patented June 17, 1890.
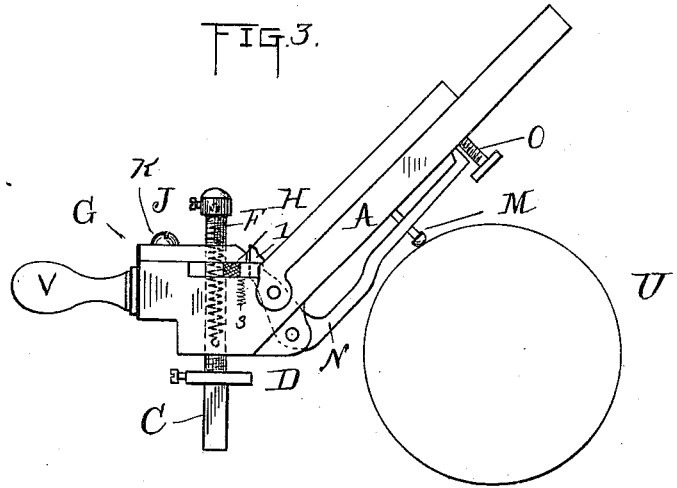
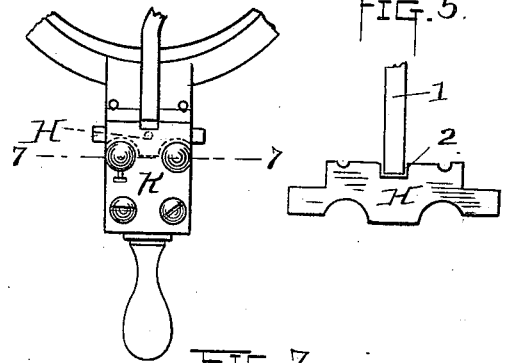
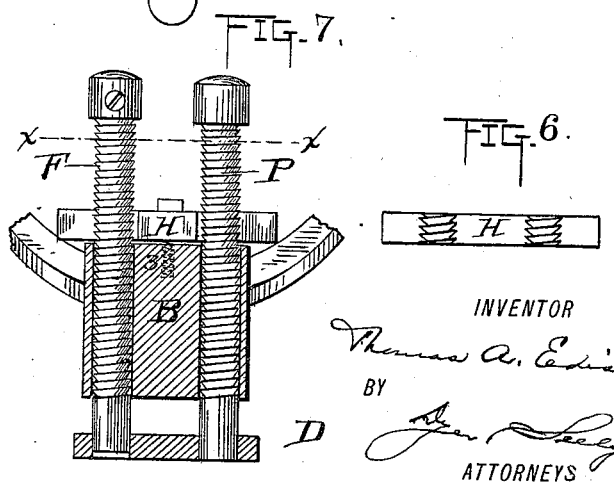
WITNESSES:
INVENTOR
Thomas A. Edison
BY
ATTORNEYS

UNITED STATES PATENT OFFICE.

THOMAS A. EDISON, OF LLEWELLYN PARK, NEW JERSEY.

AUTOMATIC DETERMINING DEVICE FOR PHONOGRAPHS.

SPECIFICATION forming part of Letters Patent No. 430,277, dated June 17, 1890.

Application filed February 11, 1889. Serial No. 299,457. (No model.)

*To all whom it may concern:*

Be it known that I, THOMAS A. EDISON, a citizen of the United States, residing at Llewellyn Park, in the county of Essex and State of New Jersey, have invented a certain new and useful Improvement in Automatic Determining Devices for Phonographs, (Case No. 825,) of which the following is a specification.

In my application, (Case No. 818,) Serial No. 296,420, filed January 15, 1889, I have described a preferred form of device for determining automatically the exact position of the recording and reproducing points on the phonogram-cylinder, whether thick or thin, and referred in general terms to other forms of device to accomplish the same purpose which I had tried.

My present invention relates particularly to that form of device referred to in said application, wherein the movement of the determining-point locks the presser-foot by its direct movement; and it consists in the several novel devices and combinations of parts, as fully hereinafter explained, and pointed out by the claims.

Figure 1:
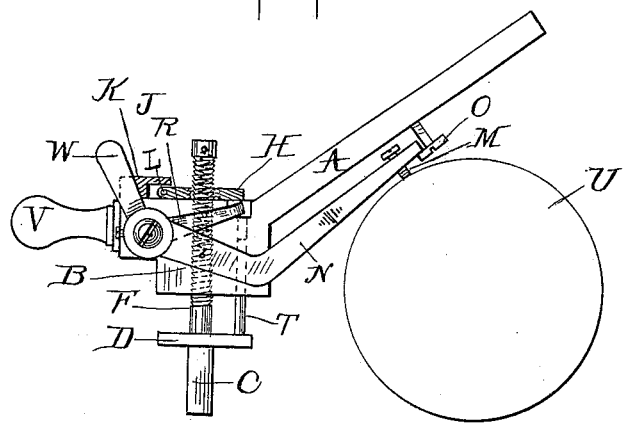
Figure 2:
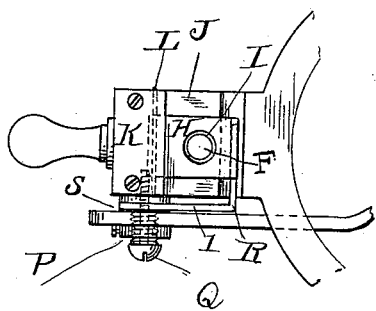

In the accompanying drawings, forming a part hereof, Figure 1 is a side elevation of a form of automatic determining device embodying my invention, showing the determining-point resting upon the surface of the phonogram-blank. Fig. 2 is a top plan view thereof, showing a small portion of the spectacle-frame. Figs. 3 to 7 show a modified form of device embodying my invention, of which Fig. 3 is a side elevation, Fig. 4 a top plan view, Figs. 5 and 6 are detail views of the locking-piece; and Fig. 7 is a section through the line 7 7 of Fig. 4.

The spectacle-frame A, bearing the recording or reproducing points, is similar in construction and mode of operation to the spectacle-frame described in my application above referred to and comprises two arms, but one of which B is shown, one for each eye of the frame. These arms project forward over the guide-rest C, and each arm is provided with a presser-foot D, which bears upon the guide-rest and supports the spectacle-frame as it moves along in a definite relation to the surface of the phonogram-blank U.

Referring to Figs. 1 and 2, the presser-foot D is a plate mounted upon the lower end of a bar F, which passes up through arm B. A spring (shown in dotted lines) is connected to a pin at the upper end of the bar F and with another pin upon the side of the arm B, and drawing downwardly upon the bar F tends to project the presser-foot downwardly to the lowermost limit of its movement. The bar F is provided with a V-shaped spirally-cut thread, and with this thread engages a locking-piece H, which is formed of a plate having a screw-threaded circular hole I, the threads of which correspond to the threads on the bar F. The piece H is located on the rabbet J of the arm B between the rabbet and the plate K, and at one side is pivoted on the bar L, thus forming a gripping-eye which engages with the bar F when it is tilted. This locking-piece H is forced directly into engagement with the bar F by the movement imparted to the determining-point M when it comes in contact with the surface of the phonogram-blank. The determining-point M in the present instance is the point of an adjusting-screw and is mounted on a lever N, the movement of which is limited by the adjusting-screw O, and is connected with a sleeve P, free to rotate on a set-screw Q, working in the side of the arm B. On the sleeve P is also mounted the L-shaped arm R, the horizontal portion of which projects under and parallel with the locking-piece, and between the hub of which arm R and the hub of lever N is located a friction-disk S, of leather or other suitable material. The object of providing this friction connection between the lever N and arm R is to permit of the movement of both these parts in unison until the arm R meets with a resistance, when its further motion will be arrested without wholly preventing further motion of the lever P, which will still remain responsive to the inequalities of the surface of the phonogram-blank, thereby preventing mutilation of said blank.

The pin T, projecting from the presser-foot vertically into a socket on the arm B, serves to prevent the presser-foot from turning on the guide-rest.

The handle V serves to raise and lower the spectacle-frame and connected parts.

By manipulating the finger-piece W, which may be a continuation of the lever P, the locking mechanism can be adjusted to the opened position when the device is ready for use. As the spectacle-frame is lowered the presser-foot will strike the guide-rest C and the bar F will slide upwardly through the arm B against the tension of the spring. The downward movement continues against the tension of the spring until the determining-point M strikes the surface of the phonogram-blank U, when the slightest further movement rotates the lever N, thereby throwing the rocking arm R upward against the locking-piece H, which, engaging with the bar F, effectually locks the presser-foot rigidly in the position of adjustment, which is determined by the determining-point. The lever bearing the determining-point, however, still is capable of movement by reason of the friction-connection, so that the determining-point will ride over the surface of the phonogram-blank without injury thereto.

Referring to Figs. 3 and 7 of the drawings, wherein parts similar to parts of Figs. 1 and 2 are similarly lettered, it will be seen that the modification consists principally in providing two bars F and P and a locking-piece H, capable of engaging with either bar, the locking-piece being thrown into engagement by the action of the short arm, which the lever N is provided with, which abuts against the recess 2 of the locking-piece. In this modification, as two screw-threaded bars F and P are used, the pin T of Figs. 1 and 2 may be dispensed with. The thread of these bars F P may be of one-half the pitch of the bar F of Fig. 1 if they are adjusted in the relationship shown in Fig. 7, where it will be seen that the broken straight line X X passes on the base of any thread on one of the bars F, but is about half a thread above the base of any thread on the other bar. By adjusting the threads of the bars F P, as just described, and providing the locking-piece H with a set of threads for each bar parallel to each other it follows that one or the other set of threads on the locking-piece will engage with one or the other of the bars F P, and thereby lock the arm of the spectacle-frame from further descent.

I have shown in Figs. 3 and 7 a coiled spring 3, situated under the locking-piece H. The object of this is to insure a readier locking of the parts, as the spring permits of a slight up-and-down motion of the locking-piece, so that it can adjust itself to the threads on the bars F, which may be in either a slightly higher or lower plane. The depth of the locking-piece H will be sufficiently less than the depth of the space between the rabbet J and plate K to permit of this slight movement. The depth of the threads on the locking parts is sufficiently great to permit of the locking thereof before the moving locking-piece reaches the bottom of the V-threads on the bar for the purpose of forming a variable connection. This variable connection permits the determining-point M to ride lightly on the surface of the phonogram-blank, as if it meets with an unusually high protuberance on the surface of the blank the determining-point will force the moving locking-piece deeper into the V-threads on the bar; but when a lower portion of the blank is reached the determining-point will fall onto it, leaving the moving locking-piece, and a space will then be left between the moving locking-piece and lever bearing the determining-point, which permits a play between those parts.

Instead of providing the bars F F with threads approximately one-half out in position, they may be provided with threads which are parallel, and the piece H may be provided with threads approximately one-half out in position.

What I claim is—

1. In a phonograph, the combination, with the recording or reproducing frame movable toward and away from the phonogram-surface, a guide-rest, and an adjustable presser-foot supporting the said frame from the guide-rest, of a determining-point carried by said frame and making contact with the phonogram-surface, and a lock locking the spectacle-frame, operated directly by the movement of the determining-point after it touches the phonogram-surface, substantially as set forth.

2. In a phonograph, the combination, with the recording or reproducing frame movable toward and away from the phonogram-surface, a guide-rest, and an adjustable presser-foot supporting the said frame from the guide-rest, of a pivoted lever carrying a determining-point, said determining-point making contact with the phonogram-surface, and a lock locking the spectacle-frame, operated directly by the movement of the determining-point after it touches the phonogram-surface, substantially as set forth.

3. In a phonograph, the combination, with the recording or reproducing frame movable toward and away from the phonogram-surface, a guide-rest, and an adjustable presser-foot supporting the said frame from the guide-rest, of a determining-point carried by said frame and making contact with the phonogram-surface, a lock locking the spectacle-frame, operated directly by the movement of the determining-point after it touches the phonogram-surface, a movable determining-point carried by said frame and making contact with the phonogram-surface, a direct lock locking the spectacle-frame, and a variable connection between the locking parts, whereby the determining-point is enabled to ride lightly on the phonogram-blank, substantially as specified.

4. In a phonograph, the combination, with the recorder or reproducer frame movable toward and away from the phonogram-surface, a guide-rest, and an adjustable presser-foot supporting the said frame from the guide-rest, of a determining-point mounted on a pivoted lever, and a lock comprising a bar of the presser-foot, and a piece actuated by the lever bearing the determining-point, substantially as set forth.

5. In a phonograph, the combination, with a movable frame and guide-rest, of a lock for locking said movable frame, comprising a bar and a piece movable toward and from said bar actuated by the contact of a movable determining-point with the phonogram, whereby the determining-point is enabled to ride lightly on the phonogram-blank, substantially as set forth.

6. In a phonogram, the combination, with a movable frame and guide-rest, of a lock for locking said movable frame, comprising two bars screw-threaded and set with relation to each other half a thread out, and a movable piece engaging with one or the other of said bars, actuated directly by the contact of the determining-point with the phonogram-blank, substantially as specified.

7. In a phonogram, the combination, with a movable frame and guide-rest, of a lock for locking said movable frame, comprising two bars screw-threaded and set with relation to each other half a thread out, and a movable piece engaging with one or the other of said bars, actuated directly by the contact of the determining-point with the phonogram-blank, and having a spring whereby a slight up-and-down play is given to said movable piece, substantially as and for the purpose set forth.

This specification signed and witnessed this 1st day of February, 1889.

THOMAS A. EDISON.

Witnesses:
  W. PELZER,
  D. H. DRISCOLL.